United States Patent [19]

Inoue et al.

[11] Patent Number: 4,654,417
[45] Date of Patent: Mar. 31, 1987

[54] PROCESS FOR PREPARING POLYALKYLENE OXIDE HAVING NARROW DISTRIBUTION OF MOLECULAR WEIGHT

[75] Inventors: Shohei Inoue; Takuzo Aida, both of Tokyo, Japan

[73] Assignee: Kanegafuchi Chemical Industry Co., Ltd., Osaka, Japan

[21] Appl. No.: 834,422

[22] Filed: Feb. 28, 1986

[30] Foreign Application Priority Data

Feb. 28, 1985 [JP] Japan .................................. 60-39663

[51] Int. Cl.$^4$ ............................................. C08G 65/12
[52] U.S. Cl. .................................................. 528/416
[58] Field of Search ....................................... 528/416

[56]  References Cited
U.S. PATENT DOCUMENTS 3,480,567 11/1969 Matsui et al. .................. 528/416 X
4,376,723 3/1983 Wolfe et al. .................... 528/416 X
4,565,845 1/1986 Inoue et al. ..................... 525/438 X

OTHER PUBLICATIONS

Aida et al., "Living Polymerization of Epoxide", Macromolecules 14, 1166 (1981).
Takuzo Aida et al., Polymerization of Epoxides Catalysed by Metalloporphine from Makromol Chem., vol. 182, pp. 1073–1079, (1981).

Primary Examiner—Earl Nielsen
Attorney, Agent, or Firm—Wegner & Bretschneider

[57] ABSTRACT

Polyalkylene oxide having narrow distribution of molecular weight is prepared by a process comprising polymerizing alkylene oxide in the presence of a complex produced by the reaction of an organoaluminum compound with a porphyrin compound and an active hydrogen-containing compound.

6 Claims, No Drawings

PROCESS FOR PREPARING POLYALKYLENE OXIDE HAVING NARROW DISTRIBUTION OF MOLECULAR WEIGHT

FIELD OF THE INVENTION

The present invention relates to a process for preparing polyalkylene oxide having a narrow distribution of molecular weight. More particularly, it relates to a process for preparing polyalkylene oxide having a narrow distribution of molecular weight comprising polymerizing alkylene oxide in the presence of an aluminum porphyrin complex as a catalyst.

BACKGROUND OF THE INVENTION

Polymerization of alkylene oxide in the presence of a complex catalyst (I) prepared by reacting an organoaluminum compound with a porphyrin compound of the formula (II) has been proposed (cf. Makromol. Chem., 182, 1073-1079 (1981)).

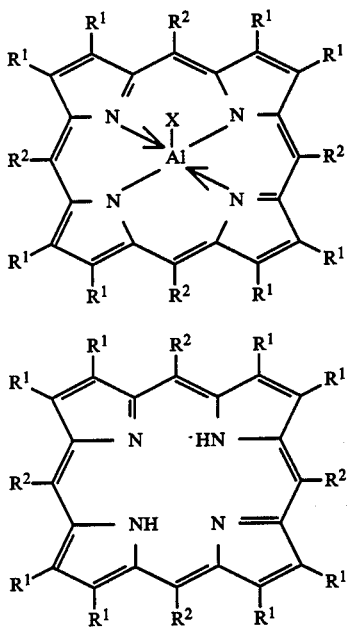

wherein $R^1$ is, the same or different, a hydrogen atom or a $C_1$-$C_4$ alkyl group; $R^2$ is, the same or different, a hydrogen atom or a $C_1$-$C_{10}$ hydrocarbon group; and X is a hydrogen atom, a halogen atom or a $C_1$-$C_4$ alkyl group.

In this method, alkylene oxide can be living polymerized by the use of the complex (I) according to the following reaction formula to give polyalkylene oxide having narrow distribution of molecular weight:

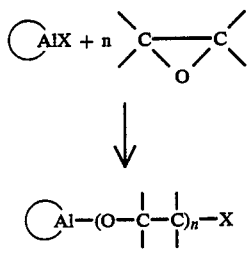

represents the complex (I), and n is a positive integer.

Since one mole of polyalkylene oxide is produced per mole of the complex (I) which is expensive, the produced polymer is fairly expensive.

SUMMARY OF THE INVENTION

One object of the present invention is to provide a process for economically preparing polyalkylene oxide having narrow distribution of molecular weight.

Another object of the present invention is to provide an improved process for preparing polyalkylene oxide having narrow distribution of molecular weight in the presence of the complex (I) in a smaller amount than in the conventional process.

These and other objects are accomplished by a process according to the present invention, which comprises polymerizing alkylene oxide in the presence of the complex (I) and an active hydrogen-containing compound.

DETAILED DESCRIPTION OF THE INVENTION

Specific examples of the organoaluminum compound to be reacted with the porphyrin compound (II) are dialkylaluminum halide having 1 to 4 carbon atoms in each alkyl group (e.g. diethylaluminum chloride and diethylaluminum bromide), trialkylaluminum having 1 to 4 carbon atoms in each alkyl group (e.g. trimethylaluminum, triethylaluminum, tripropylaluminum and tiriisobutylaluminum) and alkylaluminum hydride having 1 to 4 carbon atoms in each alkyl group (e.g. diethylaluminum hydride and diisobutylaluminum hydride). Among them, dialkyaluminum halide and trialkylaluminum, particularly, diethylaluminum chloride and triethylaluminum are preferable.

In the formulas (I) and (II), the alkyl group may be a linear one or a branched one. The hydrocarbon group includes a linear or branched alkyl group, a cycloalkyl group, an aromatic group and an aralkyl group.

The porphyrin compound (II) includes tetramethyltetraethylporphyrin, octaethylporphyrin and tetraphenylporphyrin. Particularly, the porphyrin compound (II) wherein $R^1$ is a hydrogen atom and $R^2$ is a phenyl group, namely tetraphenylporphyrin is most preferable.

The aluminum porphyrin complex (I) is prepared by reacting the organoaluminum compound and the porphyrin compound (II). For example, the reaction is carried out in an atmosphere of inert gas such as nitrogen, helium and argon in the presence of a solvent. The organoaluminum compound and the porphyrin compound (II) are used in nearly equimolar amounts. Specific examples of the solvent are hydrocarbons (e.g.

benzene, toluene and xylene), halogenated hydrocarbons (e.g. methylene chloride, chloroform and dichloroethane) and so on. When the organoaluminum compound is diethylaluminum chloride, X in the formula (I) may be a chlorine atom, and when the organoaluminum compound is triethylaluminum, X may be an ethyl group.

The complex (I) wherein X is a hydrogen atom or an alkyl group can be reacted with the active hydrogen-containing compound to give the complex (I) having a residue derived from the active hydrogen-containing compound. For example, (a) when the active hydrogen-containing compound is an organic compound having a hydroxyl group or water, there is obtained a complex (I) wherein X is an alkoxide group, a phenoxide group or a hydroxyl group, and (b) when the active hydrogen-containing compound is an organic compound having a carboxyl group, there is obtained a complex (I) wherein X is an acyloxy group.

The above described complex of the aluminum porphyrin complex (I) and the active hydrogen-containing compound may be used as a complex catalyst in the process according to the present invention.

Specific examples of alkylene oxide to be polymerized by the process according to the present invention are aliphatic alkylene oxide having a three member ring epoxy terminal group (e.g. ethylene oxide, propylene oxide, 1-butylene oxide and epichlorohydrin) and aromatic alkylene oxide having a three member ring epoxy group (e.g. styrene oxide) and mixtures thereof. Among them, aliphatic alkylene oxide, particularly propylene oxide and a mixture of propylene oxide and ethylene oxide are preferable.

The active hydrogen-containing compound includes mono-, di- or tri-hydric alcohols, and phenols and mono-, di- or tri-basic carboxylic acids. Specific examples of alcohols are saturated aliphatic alcohols (e.g. methanol, ethanol and butanol), unsaturated alcohols (e.g. allyl alcohol, ethyleneglycol monoallyl ether, 3-butenyl alcohol, 2-hydroxyethyl acrylate and methacrylate and vinylbenzyl alcohol) and polyhydric alcohols (e.g. triethylene glycol, tripropylene glycol, ethylene glycol, trimethylolpropane and glycerol). Specific examples of phenols are monohydric phenols (e.g. cresol, xylenol and phenol), unsaturated phenols (vinylphenol, allylphenol and allyloxyphenol) and polyhydric phenols (e.g. resorcin, p-dihydroxybenzene, 2,4-toluenediol, 1,3,5-benzenetriol and 2,2'-bis(4-hydroxyphenyl)propane). Specific examples of carboxylic acid are saturated carboxylic acids (e.g. acetic acid, propionic acid, octanoic acid and stearic acid), unsaturated carboxylic acids (e.g. acrylic acid, methacrylic acid, benzoic acid and vinylbenzoic acid) and polyhydric carboxylic acids (e.g. adipic acid, sebacic acid, maleic acid, fumaric acid, 1,2,3-propane tricarboxylic acid, α-hydroxysuccinic acid, terephthalic acid and 1,2,4-benzene tricarboxylic acid). In order to introduce a functional group at the terminal of polyalkylene oxide molecule, unsaturated alcohols, unsaturated carboxylic acids, polyhydric alcohols and polybasic carboxylic acids are preferable.

As described in the above, the complex (I) wherein X is an hydrogen atom or an alkyl group can react with the active hydrogen-containing compound. Thus, when such complex (I) is used as the catalyst, the hydrogen-containing compound should be used in such amount that the unreacted active hydrogen-containing compound still remains in the polymerization system.

The polymerization reaction is assumed to proceed according to, for example, the following reaction formula:

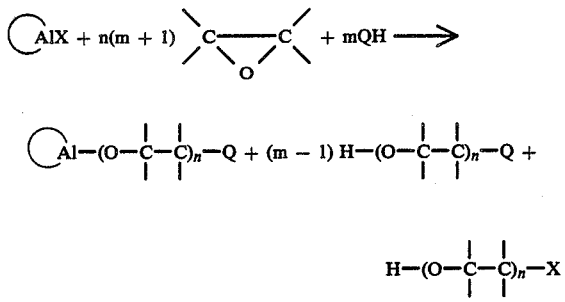

wherein

is the same as defined above, n and m are positive integers, and QH represents the active hydrogen-containing compound.

According to the process of the invention, polyalkylene oxide is produced in an equimolar amount with the total amount of the complex (I) and the active hydrogen-containing compound. Therefore, when the molar ratio of the active hydrogen-containing compound to the complex (I) is larger, polyalkylene oxide having a lower molecular weight is obtained, while when said ratio is smaller, polyalkylene oxide having a larger molecular weight is obtained. The molar ratio of the complex (I) to the active hydrogen-containing compound is usually 1:1 to 1:50. However, the molar ratio of 1:100 or less or even 1:500 may be used.

When the molar ratio of the complex (I) to alkylene oxide to be polymerized is larger, the polymerization rate is higher. The amount of the complex (I) is 0.001 to 10% by mole, preferably 0.01 to 1% by mole based on the amount of alkylene oxide. The amount of the active hydrogen-containing compound is 0.1 to 10% by mole, preferably 0.1 to 5% by mole based on the amount of alkylene oxide.

Polymerizaton of alkylene oxide is carried out in the presence of the complex (I) and the active hydrogen-containing compound in an atmosphere of an inert gas such as nitrogen in the presence or absence of a solvent. Specific examples of the solvent used for the polymerization are hydrocarbons (e.g. benzene, toluene and xylene) and halogenated hydrocarbons (e.g. methylene chloride, chloroform and dichloroethane). The polymerization temperature is a room temperature or higher.

Polyalkylene oxide prepared by the process of the invention has a narrow distribution of molecular weight (Mw/Mn) of 1.5 or less, particularly 1.3 or less. The polymer may be a homopolymer of a single kind of alkylene oxide or a random or block copolymer of two or more kind of alkylene oxide. According to the present invention, liquid polyalkylene oxide having a terminal hydroxyl or unsaturated group and a molecular weight of 500 to 20,000 is advantageously prepared.

When polyalkylene oxide has a terminal hydroxyl group, it may be used as a raw material of polyurethane to be used as adhesives, rubbers and foams. When the molecule of polyalkylene oxide has an unsaturated group at one end, polyalkylene oxide may be used as a macromonomer.

The present invention will be hereinafter explained further in detail by following examples.

REFERENCE EXAMPLE

Preparation of Complex (I)

In methylene chloride (20 ml), diethylaluminum chloride (0.15 ml) and $\alpha,\beta,\gamma,\delta$-tetraphenylporphyrin (0.61 g) were reacted in a nitrogen atmosphere at a room temperature for 2 hours. Then, the reaction mixture was heated under reduced pressure to remove the volatile components to obtain a complex (hereinafter referred to as "Catalyst A"). Catalyst A may have the formula (I) wherein $R^1$ is a hydrogen atom, $R^2$ is a phenyl group and X is a chlorine atom.

EXAMPLES 1-10

In a 50 ml glass flask, Catalyst A (0.31 g, 0.5 mmol) was charged. In a nitrogen atmosphere, propylene oxide and an active hydrogen-containing compound as shown in the Table were added in amounts as shown in the Table and reacted with stirring at a room temperature for a reaction time shown in the Table. After polymerization, unreacted propylene oxide was removed under reduced pressure to obtain polypropylene oxide. A molecular weight and its distribution were determined by GPC. The results are also shown in Table. GPC analysis was performed at an oven temperature of 40° C. by the use of a column filled with polystyrene gel (manufactured by Toyo Soda Co. Ltd., Japan) and tetrahydrofuran as an eluent.

TABLE

| Example No. | Active hydrogen-containing compound | | Propylene oxide (mmol) | Reaction time (days) | Yield (%) | Polypropylene oxide | | |
|---|---|---|---|---|---|---|---|---|
| | Compound | Amount (mmol) | | | | Mw | Mn | Mw/Mn |
| 1 | Methanol | 0.5 | 100 | 2 | 100 | 7,350 | 6,500 | 1.13 |
| 2 | ↑ | 1.5 | 100 | 2 | 100 | 3,300 | 3,100 | 1.07 |
| 3 | ↑ | 3.5 | 100 | 2 | 100 | 1,600 | 1,500 | 1.07 |
| 4 | ↑ | 4.5 | 100 | 2 | 100 | 1,400 | 1,300 | 1.08 |
| 5 | ↑ | 12.0 | 250 | 2 | 100 | 1,300 | 1,200 | 1.08 |
| 6 | ↑ | 24.5 | 500 | 25 | 75 | 980 | 900 | 1.09 |
| 7 | Allyl alcohol | 10.0 | 200 | 2 | 100 | 1,420 | 1,300 | 1.09 |
| 8 | Hydroxyethyl methacrylate | 12.0 | 250 | 7 | 49 | 600 | 540 | 1.10 |
| 9 | Ethylene glycol | 2.25 | 100 | 6 | 76 | 2,000 | 1,800 | 1.11 |
| 10 | Acetic acid | 4.5 | 100 | 3 | 70 | 980 | 890 | 1.10 |

What is claimed is:

1. A process for preparing polyalkylene oxide having a narrow distribution of molecular weight, which comprises polymerizing an alkylene oxide in the presence of a complex produced by the reaction of an organoaluminum compound with a porphyrin compound and an active hydrogen-containing compound.

2. The process according to claim 1, wherein the porphyrin compound is tetraphenylporphyrin.

3. The process according to claim 1, wherein the alkylene oxide is propylene oxide.

4. The process according to claim 1, wherein the alkylene oxide is a mixture of propylene oxide and ethylene oxide.

5. The process according to claim 1, wherein the active hydrogen-containing compound is one having at least two active hydrogen atoms.

6. The process according to claim 1, wherein the active hydrogen-containing compound is one having a terminal unsaturated group.

* * * * *